United States Patent
Creamer et al.

(10) Patent No.: US 7,739,389 B2
(45) Date of Patent: Jun. 15, 2010

(54) PROVIDING WEB SERVICES FROM A SERVICE ENVIRONMENT WITH A GATEWAY

(75) Inventors: Thomas E. Creamer, Boca Raton, FL (US); Joseph H. McIntyre, Austin, TX (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 10/718,442

(22) Filed: Nov. 20, 2003

(65) Prior Publication Data

US 2005/0114437 A1 May 26, 2005

(51) Int. Cl.
*G06F 15/16* (2006.01)
(52) U.S. Cl. ............... 709/227; 709/202; 709/249; 709/217
(58) Field of Classification Search .......... None
See application file for complete search history.

(56) References Cited

U.S. PATENT DOCUMENTS

| | | | |
|---|---|---|---|
| 6,421,781 B1 | 7/2002 | Fox et al. | |
| 7,107,596 B2 * | 9/2006 | Brown et al. | 719/316 |
| 7,143,420 B2 * | 11/2006 | Radhakrishnan | 719/328 |
| 7,184,534 B2 * | 2/2007 | Birch et al. | 379/211.01 |
| 7,207,048 B2 * | 4/2007 | McQuillan et al. | 719/328 |
| 2001/0037404 A1 | 11/2001 | Hafsteinsson et al. | |
| 2002/0019243 A1 | 2/2002 | Zhang et al. | |
| 2002/0026471 A1 | 2/2002 | Bent et al. | |
| 2002/0049675 A1 | 4/2002 | Kailamaki et al. | |
| 2002/0078210 A1 * | 6/2002 | Aschir | 709/227 |
| 2002/0143819 A1 | 10/2002 | Han et al. | |
| 2002/0143866 A1 | 10/2002 | Lewis et al. | |
| 2002/0146018 A1 | 10/2002 | Kailamaki et al. | |
| 2002/0173295 A1 | 11/2002 | Nykanen et al. | |
| 2002/0174117 A1 | 11/2002 | Nykanen | |
| 2002/0176377 A1 | 11/2002 | Hamilton | |
| 2003/0182392 A1 * | 9/2003 | Kramer | 709/217 |
| 2005/0044197 A1 * | 2/2005 | Lai | 709/223 |

OTHER PUBLICATIONS

"Lotus Offerings", Adivsorama, Websphereadvisor, (viewed Dec. 12, 2002).
The Parlay Group: Web Services Working Overview, "Parlay Web Services Overview", Oct. 31, 2002.

\* cited by examiner

*Primary Examiner*—John B. Walsh
(74) *Attorney, Agent, or Firm*—Novak Druce + Quigg

(57) ABSTRACT

A method for providing Web services can include the step of registering a Web service with a service provider. The Web service can be installed within a service environment. A request for the Web service can be sent by a service user to an application server disposed within an application environment. The network space of the application environment can be different from the network space of the service environment. The application server can access the requested Web service using a gateway, such as a Parlay gateway. Once the Web service is accessed by the application server, service data for the Web service can be transported between the application server and the service user.

15 Claims, 3 Drawing Sheets

PROVIDING WEB SERVICES FROM A SERVICE ENVIRONMENT WITH A GATEWAY

BACKGROUND

1. Field of the Invention

The present invention relates to the field of computer science and, more particularly, to providing web services from an application server.

2. Description of the Related Art

As the Internet becomes increasingly pervasive in our daily lives, the use of software services, called Web services, within Internet-connected computing devices has increased in corresponding fashion. Web services, which are sometimes called application services, are services that are made available from a business's Web server for Web users or other Web-connected programs. Users can access web services directly from a central server or through a peer-to-peer arrangement. Some Web services can communicate with other services, thereby exchanging procedures and data with one another often with aid of a class of software known as middleware.

Web services used within a household can integrate the functions of communication devices such as a television, stereo system, telephony system, and computer in a user-friendly and user specific manner. It should be noted that Internet related services are not restricted to services that enhance browsing and file transfer using a computer, but can include any Web based service utilized by any device or service provider. For example, a Web service installed within a telecommunication switch can enable a variety of telephony features such as conversation transcription, language translation, voice messaging, voice Internet browsing, audible email retrieval, and the like. In another example, a Web service used in conjunction with Internet radio can permit a user's receiving device to time delay streamed radio content or to customize the stations, programs, and advertisements presented upon the receiving device in a user-specific manner.

One challenge that Web service providers currently have involves network security issues. Web servers can function across a multitude of open, trusted, and secure networks. The different users of a Web service can have vastly different security requirements. It can be highly inefficient to implement security requirements at the Web services level as such security can potentially limit the environments in which the Web services can be installed. Further, the development time and resulting cost can be significantly greater when security overhead is handled at the level of individual Web services.

One method used by service providers to bridge different networks involves the use of a gateway, such as a Parlay gateway. The Parlay gateway can be utilized by service providers as a "secure bridge" between untrusted networks, trusted networks, and secure networks. Conventional technologies, however, do not permit Web services to be provided in an open Internet environment when a Parlay gateway is involved.

SUMMARY OF THE INVENTION

The present invention provides a method, a system, and an apparatus for providing Web services. More specifically, the present invention can install one or more Web services within an environment that includes a gateway, such as an Open Services Architecture (OSA)/Parlay gateway. The gateway can permit Web services installed within a service environment to be accessed by an application server installed within an application environment. The application server can provide the functions and features of the Web service to a service user. In one embodiment, the application server can be a Web serving component of an integrated Web solution, such as WebSphere by International Business Machines, Corporation (IBM) of Armonk, N.Y.

The gateway can handle protocol and security differences between the two environments and can integrate features of a Web service with other Web services and software routines. In one embodiment, the gateway can utilize at least two subcomponents to carry out these tasks. One subcomponent can be specific to a designated Web service. The other subcomponent can interface with multiple different Web services of a common type having common functions, thereby being a component with a generalized functionality instead of one uniquely tailored for a discrete service. Data can be exchanged between the gateway and an application server disposed within the application environment via a protocol such as the Internet Inter-ORB Protocol (IIOP) that conforms to the Common Object Request Broker Architecture (CORBA).

One aspect of the present invention can include a method for providing Web services. The method can include the step of registering a Web service with a service provider. The Web service can be installed within a service environment. A request for the Web service can be sent from a service user and received by an application server disposed within an application environment. The application environment can specify a different network space than the service environment. For example, the application environment can be an open Internet environment and the service environment can be a trusted network environment and/or a secure network environment. The application server can transport service data for the requested Web service between itself and the service user. In one embodiment, the Web service can be registered with a service registry, where the received request can result from the service user selecting the Web service from the service registry.

In a particular embodiment, at least one Java servlet can be executed within the application environment responsive to receiving the request for the Web service. The servlet can initiate the appropriate Web service installed within the service environment. The requested Web service can be accessed across a gateway, such as a Parlay gateway. In one embodiment, the access across the gateway can involve the initialization of a component of the gateway that is specific to the Web service. Further, another component that is applicable to multiple Web services can be initiated as appropriate. Information can be conveyed between the gateway and the application server using a CORBA compliant protocol.

Another aspect of the present invention can include a system for providing Web services. The system can include a client application, an application server, and a gateway. The client application can execute at least one Web service, which can have an associated service description written in a Web Service Definition Language (WSDL). The application server can distribute the Web service to the client application. In a particular embodiment, the application server can include an application engine and/or a component engine; the application engine can execute modular server-side applications; and, the component engine can provide one or more interface routines used by the application engine.

The gateway can exist between the application server and a network location in which the Web service is installed. In one embodiment, the gateway can be a Parlay gateway. The gateway can include a function specific component configured for a particular Web service and a service component configured for a multitude of Web services. In another embodiment, a communication link, which can exchange Web service data using CORBA objects, can exist between the gateway and the application server.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
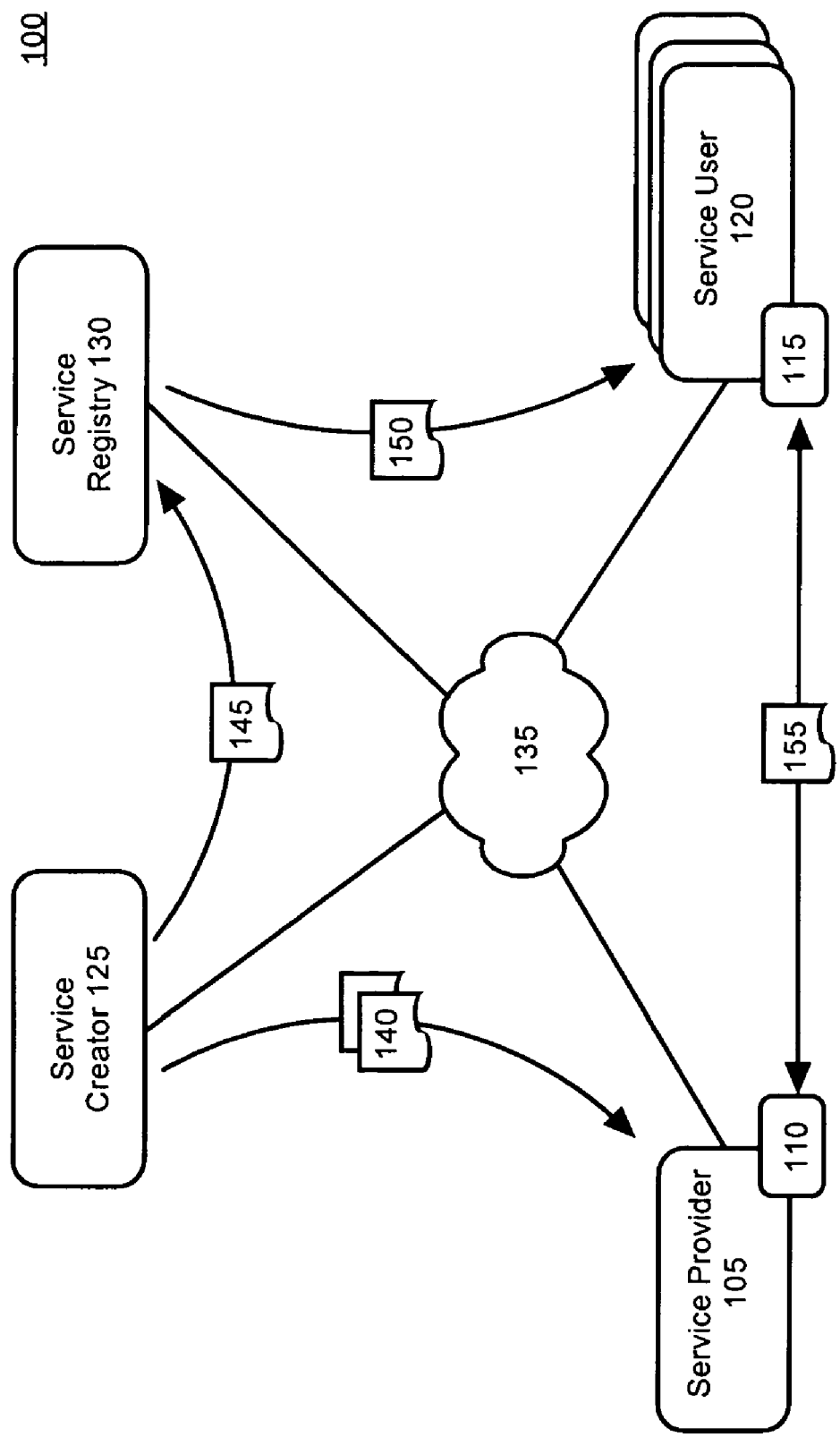
FIG. 1 is a schematic diagram illustrating a system for providing Web services in accordance with the inventive arrangements disclosed herein.

FIG. 1 is a schematic diagram illustrating a system 100 for providing Web services in accordance with the inventive arrangements disclosed herein. The system 100 can include a service creator 125, a service registry 130, a service provider 105, and a service user 120. The service creator 125 can be the Web service-generating source. A Web service can be any application or application component that can be activated and executed across the Internet or other network that provides one or more services for a user. Exemplary Web services can include, a three-way-calling feature for telephony services, a voice messaging service, a transcription service, a translation service, a tax service, and the like.

The service registry 130 can be a common marketplace for Web services. The service creator 125 can provide service registry information 145 to the service registry. Service registry information 145 can include, but is not limited to, such information as a Web service name, a service description, pointers to executable service component, and other pertinent description data. The Web service details can then be published to a multitude of potential service users, including service user 120. In one embodiment, the service registry 130 can be a Universal Description, Discovery, and Integration (UDDI) registry. The invention, however, is not limited in this regard, and any type of service registry 130 can be utilized in system 100.

The service provider 105 can be the entity that provides service users with one or more services, such as telephony services, Internet services, cable services, video services, word processing services, interactive voice response (IVR) services, voice-messaging services, and the like. The service provider 105 can receive the Web service 140 from the service creator 125, can install the Web service 140 within suitable computing hardware, can integrate the Web service 140 with other services as appropriate, and can provide the Web service 140 to the service user 120.

For example, the service provider 105 can be a telephony service provider and the Web service 140 can be a call-waiting feature, which can be used in conjunction with the telephony services of the service provider 105. In another example, the service provider 105 can be an Internet service provider, and the Web service 140 can be a language translation service.

The service provider 105 can include an application server 110, which can receive a request for Web services from the service user and can provide the appropriate Web services. In providing the Web services, the application server 110 can establish appropriate communication connections between the service provider 105 and the service user 120 and can convey service data 155 across the established communication connections.

In operation, the service creator 125 can create a service. The Web service 140 can be conveyed across network 135 to the service provider 105. The network 135 can include the Internet, an intranet, a Local Area Networks (LAN), a Wide Area Network (WAN), and the like. Further, the network 135 can include secure and open communication pathways. Moreover, the network 135 can utilize land based communication lines, such Public Switched Telephone Network (PSTN) lines and coaxial cable lines, as well as wireless communication links. The service provider 105 can install the Web service 140 within an environment that includes the application server 110. The application server 110 can provide the Web service 140 to one or more service users 120.

The service creator 125 can also publish the service by sending service registry information 145 across the network 135 to a service registry 130, such as a UDDI registry. The service registry 130 can promulgate the created service registry information within a publicly accessible directory. The service user 120 can access the service registry 130 via network 135 and can browse the directory of Web services. After browsing the service registry 130, the service user 120 can select the Web service of the service creator 125. Once the selection is made, the service registry can convey service-enabling data 150 to the service user 120, and more specifically to the client application 115.

The client application 115 can then automatically send a Web service request to the application server 110. The application server 110 can initialize an instance of the selected Web service, which has already been installed within the service environment of the service provider 105. The application server 110 can then convey service data 155 to the client application 115.

Figure 2:
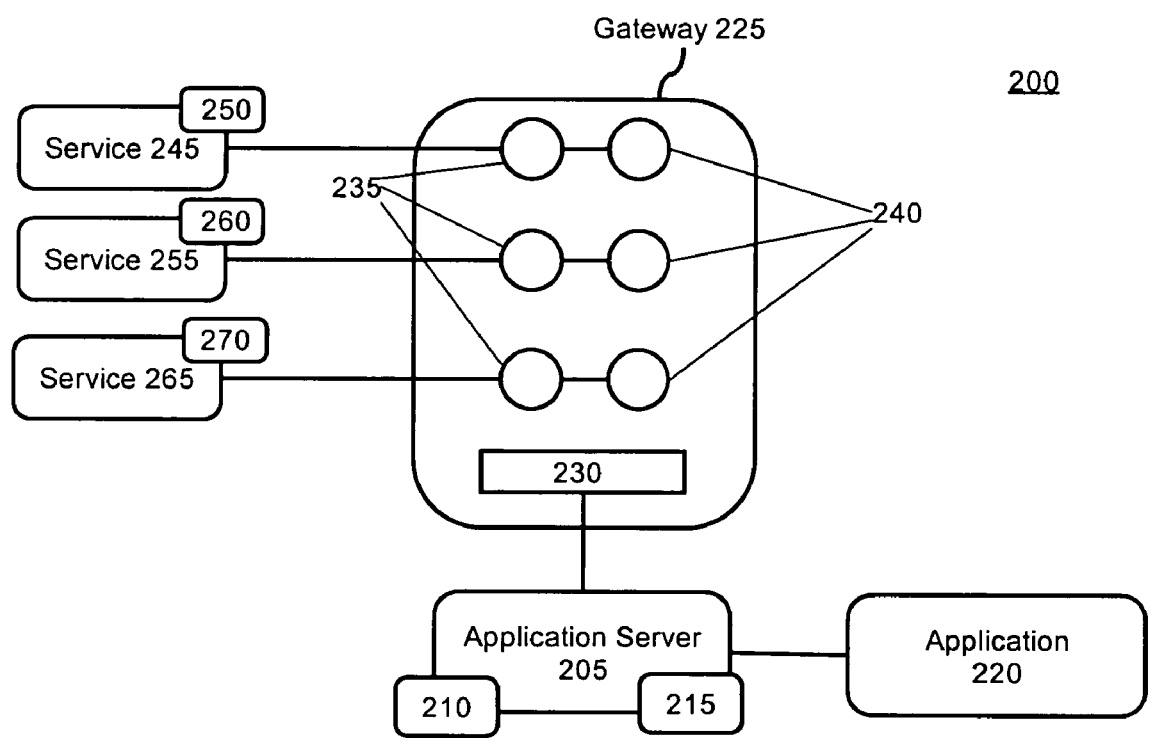
FIG. 2 is a schematic diagram illustrating a system for providing Web services in accordance with the inventive arrangements disclosed herein.

FIG. 2 is a schematic diagram illustrating a system 200 for providing services in accordance with the inventive arrangements disclosed herein. In one embodiment, the system 200 can represent the environment of the service provider 105 illustrated in FIG. 1. The system 200 can include an application server 205, a gateway 225, and services 245, 255, and 265.

The application server 205 can provide one or more web services to client application 220. In one embodiment, the application server 205 can represent the application server 110 illustrated in FIG. 1. The application server 205 can be a stand-alone application or can be integrated within an application that provides Internet, intranet, or Web solutions. For example, the application server 205 can be a component of a solution like WebSphere (TM) by International Business Machines (IBM) Corporation of Armonk, N.Y. More specifically, the application server 205 can be a WebSphere Application Server for Telecommunication (WAS-T) for providing telecommunications Web services within the WebSphere solution platform.

The application server 205 can include an application engine 210 and a component engine 215. The application engine 210 can initiate modular server-side applications used to perform designated functions of the application server. For example, the application server 210 can initiate one or more Java (TM) servlets. In another example, the application engine 210 can initiate one or more Common Gateway Interface (CGI) applications. The component engine 215 can include a series of interface routines used by the application engine 210. For example, the component engine 215 can include Enterprise Java Beans (EJB) components that can be used in conjunction with the application engine when Java servlets and/or Java Beans are used by the application engine 210. In another example, the component engine 215 can include components that comply with the Component Object Model/Distributed Component Object Model (COM/DCOM) architecture. The component engine 215 can also include one or more Application Program Interface (API) modules necessary to establish communications between the application server 205 and the gateway 225.

The gateway 225 can represent a layered solution for implementing Web solutions that facilities software reuse. In one embodiment, the gateway 225 can be an Open Services Architecture (OSA)/Parlay gateway. The gateway can include a framework 230, one or more function specific components 235, and one or more service components 240. The framework 230 can include the established protocols and architecture for the gateway 225, such as the OSA/Parlay framework. The framework 230 can also manage the initialization of the gateway 225 components needed to execute an installed Web service.

Each function specific component 235 can be specific to installed services. For example, one function specific component 235 can be associated with service 245, another can be associated with service 255, and another can be associated with service 265. The service components 240 can be generic in nature and can be used to interface with a variety of different services.

For example, in one configuration, service 245 and service 255 can be tax related Web services and the service components 240 can be a tax calculation component that can be used by service 245 and service 255. In another configuration, service 245, service 255, and service 265 can be call-waiting services and the service components 240 can be a generalized call waiting routine used by all three services.

Service 245, service 255, and service 265 can each represent a Web service installed within the system 200. Service 245 can be associated with service definition 250; service 255 can be associated with service definition 260, and service 265 can be associated with service definition 270. Each service definition can specify the data structure and methods for the associated service. In one embodiment, the service definition 250, 260, and 270 can each be Web Service Definition Language (WSDL) definitions.

Figure 3:
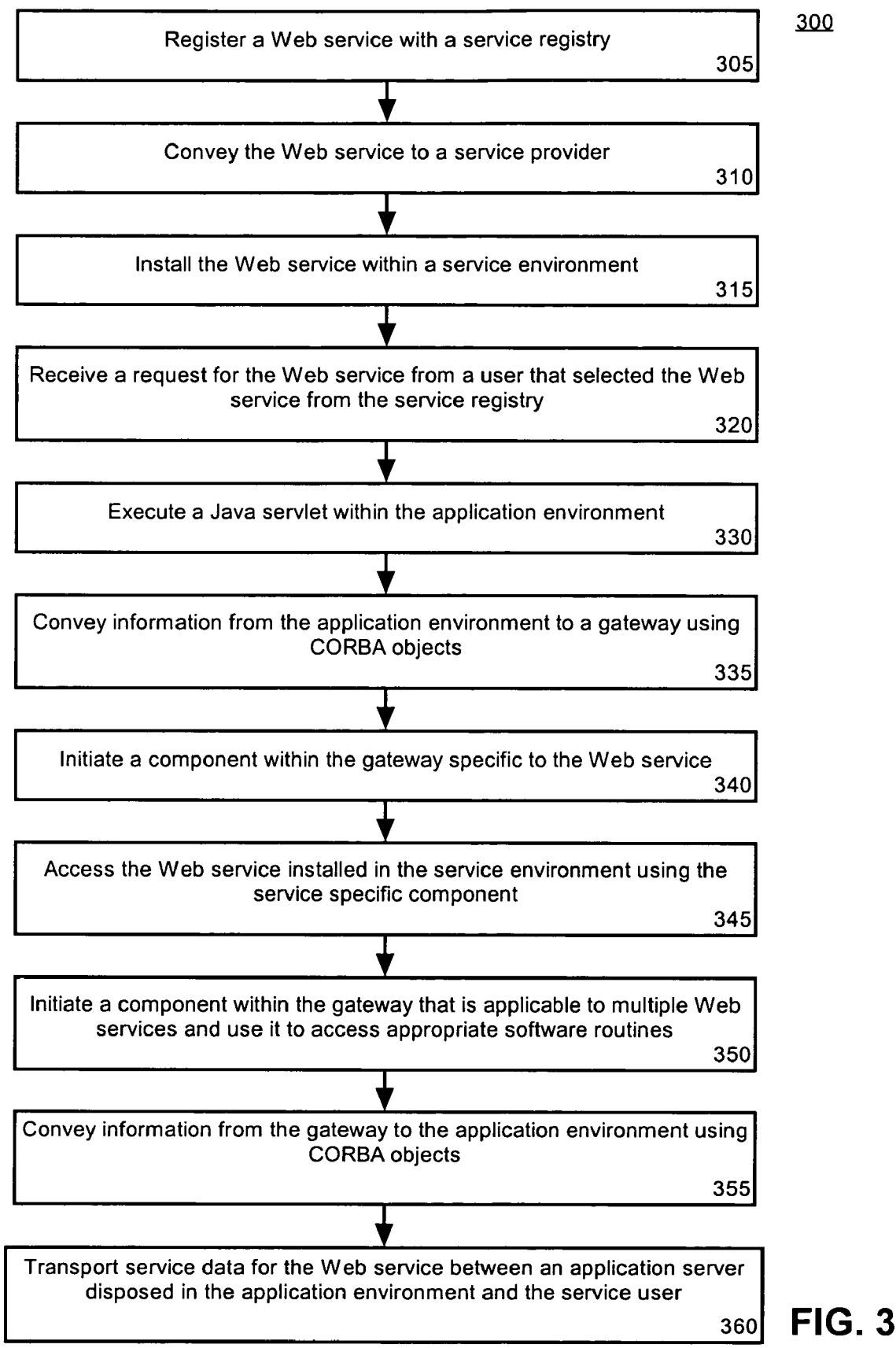
FIG. 3 is a flow chart illustrating a method for providing Web services in accordance with the inventive arrangements disclosed herein.

FIG. 3 is a flow chart illustrating a method 300 for providing Web services in accordance with the inventive arrangements disclosed herein. The method 300 can be performed in the context of a system that provides Web services to service users. The method can begin in step 305, where a Web service can be registered with a service registry, such as a UDDI registry. In step 310, the Web service can be conveyed from a service developer to a service provider. In step 315, the service provider can install the Web service within a service environment. The service environment can be an open environment, a trusted environment, and/or a secure environment.

In step 320, a request for the Web service can be received. For example, a service user can access the service registry in which the Web service is installed. The service user can select the Web service resulting in the request for the Web service being conveyed to the service provider. For example, an application server disposed within an application environment can receive the request. The application environment can be an open environment, a trusted environment, and/or a secure environment, and the application environment need not be of the same environment type as the service environment.

In step 330, a Java servlet can be executed within the application environment by the application server that establishes an interface with a gateway, such as a Parlay gateway. The java servlet can handle overhead relating to the selected Web service. In one embodiment, the java servlet can perform the functions necessary to reconcile the disparate message formats. In such an embodiment, a communication pathway between the application server and the gateway can require different messaging conventions than a communication pathway between the application server and the user. For example, messages conveyed between the application server and the gateway can be formatted for the CORBA specification and messages conveyed between the application server and the user can be formatted for the Simple Object Access Protocol (SOAP) specification.

In another embodiment, the Java servlet can provide information necessary to utilize the gateway, such as a login identification and/or password, which can be server specific and/or user specific. In yet another example, the Java servlet can record usage information pertaining to the user, such as billing information for the requested Web service.

In step 335, responsive to the execution of the servlet, service-initiating information specifying a particular installed Web service can be conveyed to a gateway. In step 340, the component(s) can be initiated within the gateway that is specific to the requested Web service. In step 345, the service specific component(s) can access the Web service, which can be installed in the service environment. The Web service can be a standalone application or it can be an application dependant upon other Web services and/or software routines. When the specific Web service is dependant upon other software routines, the method can perform step 350; step 350 is otherwise unnecessary.

In step 350, a generally applicable software component can be initiated within the gateway. This component can be used to access appropriate software routines, which may include one or more installed Web services. Together, the service specific component(s) and the more general component provide the functionality necessary to enable the Web service. For example, the Web service can be a language transcription service; the service specific component can be a vender specific algorithm for improving speech recognition accuracy; and, the general component can include vender independent language transcription functions.

In step 355, the gateway can convey information from the Web services installed within the service environment to the application server disposed within the application environment. This information can be conveyed using CORBA objects. In step 360, the application server can transport service data for the Web service between itself and the service user.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for providing Web services comprising the steps of:
    registering a Web service with a service registry;
    conveying the Web service to a service provider;
    installing the Web service within a service environment having a gateway;
    receiving a request for the Web service from a service user, wherein the user has selected the Web service from the service registry, wherein said request is received within an application server disposed within an application environment, and wherein said application environment is an open Internet environment and wherein said service environment is at least one of a trusted network environment and a secure network environment;
    executing a servlet to establish a communication pathway between the application server and the gateway;
    conveying service-initiating information to the gateway, the service-initiating information specifying the requested Web service;
    initiating within said gateway a function specific component that is specific to the requested Web service and a generic service component that is applicable to multiple Web services;
    accessing said requested Web service across the gateway by utilizing the component;
    conveying information from the Web service via the gateway to the application server; and
    transporting service data for said Web service from the application server disposed in said application environment to the service user.

2. The method of claim 1, said accessing step further comprises the step of:
    conveying information between the gateway and the application environment using a Common Request Broker Architecture.

3. The method of claim 1, further comprising the step of:
    responsive to receiving the request for the Web service, executing at least one Java servlet within said application environment that initiates said accessing step.

4. The method of claim 1, wherein said gateway is a Parlay gateway.

5. The method of claim 1, wherein the servlet is executed within the application environment.

6. A computer-implemented system for providing Web services comprising:
    a computer functioning as a service registry for registering a Web service installed within a service environment;
    a computer functioning as an application server configured to distribute said Web service to a service user upon receiving a request from the service user, where the user has selected the Web service from the service registry, wherein said application server is disposed within an application environment, and wherein the application environment is an open Internet environment and wherein said service environment is at least one of a trusted network environment and a secure network environment; and
    a gateway between said application server and the service environment for accessing the requested Web service installed within the service environment and for conveying information from the Web service to the application server, wherein the gateway further comprises a function specific component configured specifically for the requested Web service and a generic service component that is applicable to multiple Web services.

7. The system of claim 6, wherein said Web service is associated with a Web Service Definition Language definition.

8. The system of claim 6, wherein said application server further comprises an application engine configured to execute modular server-side applications.

9. The system of claim 8, wherein said application server further comprises a component engine configured to provide interface routines for the applications of said application engine.

10. The system of claim 6, further comprising:
    a communication link for exchanging Web service data between said gateway and said application server, wherein said communication link utilizes a Common Object Request Broker Architecture.

11. The system of claim 6, wherein said gateway is a Parlay gateway.

12. A machine-readable storage having stored thereon, a computer program having a plurality of code sections, said code sections executable by a machine for causing the machine to perform the steps of:
    registering a Web service with a service registry;
    conveying the Web service to a service provider;
    installing the Web service within a service environment having a gateway;
    receiving a request for the Web service from a service user, wherein the user has selected the Web service from the service registry, wherein said request is received within an application server disposed within an application environment, and wherein said application environment is an open Internet environment and wherein said service environment is at least one of a trusted network environment and a secure network environment;
    executing a servlet to establish a communication pathway between the application server and the gateway;
    conveying service-initiating information to the gateway, the service-initiating information specifying the requested Web service;
    initiating within said gateway a function specific component that is specific to the requested Web service and a generic service component that is applicable to multiple Web services;
    accessing said requested Web service across the gateway by utilizing the component;
    conveying information from the Web service via the gateway to the application server; and
    transporting service data for said Web service from the application server disposed in said application environment to the service user.

13. The machine-readable storage of claim 12, said accessing step further comprises the step of:

conveying information between the gateway and the application environment using a Common Request Broker Architecture.

14. The machine-readable storage of claim 12, further comprising the step of:

responsive to receiving the request for the Web service, executing at least one Java servlet within said application environment that initiates said accessing step.

15. The machine-readable storage of claim 12, wherein said gateway is a Parlay gateway.

\* \* \* \* \*